No. 656,489. Patented Aug. 21, 1900.
H. STRATER.
APPARATUS FOR CHARGING RECEPTACLES WITH MEASURED QUANTITIES OF LIQUID.
(Application filed Mar. 22, 1900.)
(No Model.) 2 Sheets—Sheet 1.
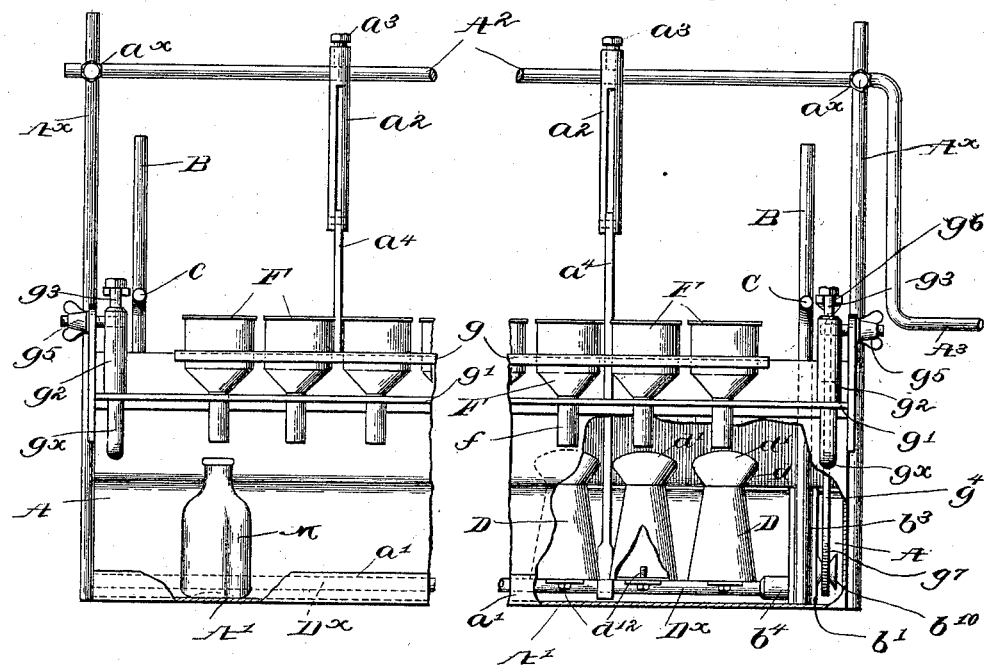
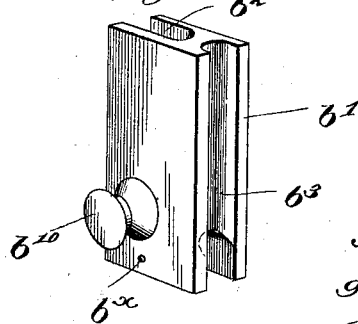
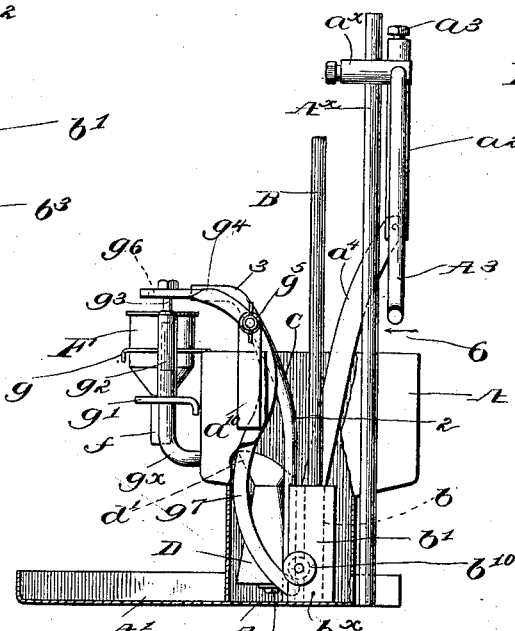
Witnesses.
W. C. Lunsford.
Fred S. Greenleaf.
Inventor,
Herman Strater
by Crosby & Gregory
attys.

No. 656,489. Patented Aug. 21, 1900.
H. STRATER.
APPARATUS FOR CHARGING RECEPTACLES WITH MEASURED QUANTITIES OF LIQUID.
(Application filed Mar. 22, 1900.)

(No Model.) 2 Sheets—Sheet 2.

Witnesses.
W. C. Lunsford.
Fred A. Gunther.

Inventor.
Herman Strater,
by Crosby & Gregory
attys.

UNITED STATES PATENT OFFICE.

HERMAN STRATER, OF BOSTON, MASSACHUSETTS.

APPARATUS FOR CHARGING RECEPTACLES WITH MEASURED QUANTITIES OF LIQUID.

SPECIFICATION forming part of Letters Patent No. 656,489, dated August 21, 1900.

Application filed March 22, 1900. Serial No. 9,637. (No model.)

*To all whom it may concern:*

Be it known that I, HERMAN STRATER, a citizen of the United States, and a resident of Boston, Massachusetts, have invented an Improvement in Apparatus for Charging Receptacles with Measured Quantities of Liquid, of which the following description, in connection with the accompanying drawings, is a specification, like letters and numerals on the drawings representing like parts.

This invention has for its object the production of efficient apparatus for filling simultaneously a plurality of receptacles—such as milk cans or bottles, jars, and the like—with liquid taken from a common source of supply, a series of conveyers, each holding a certain desired quantity, being filled, lifted into position, and then tilted to discharge their contents into the waiting vessels. Thus the latter are not only filled rapidly and without waste of the liquid, but each vessel is provided with a measured supply, the apparatus herein illustrated closely imitating the movements of the human arm in handling a measure when filling a vessel.

My invention is particularly adapted for use wherein a large number of vessels must be periodically filled with a substantially-predetermined quantity of liquid—as, for instance, milk-bottles, now in such very extended use.

Figure 3:
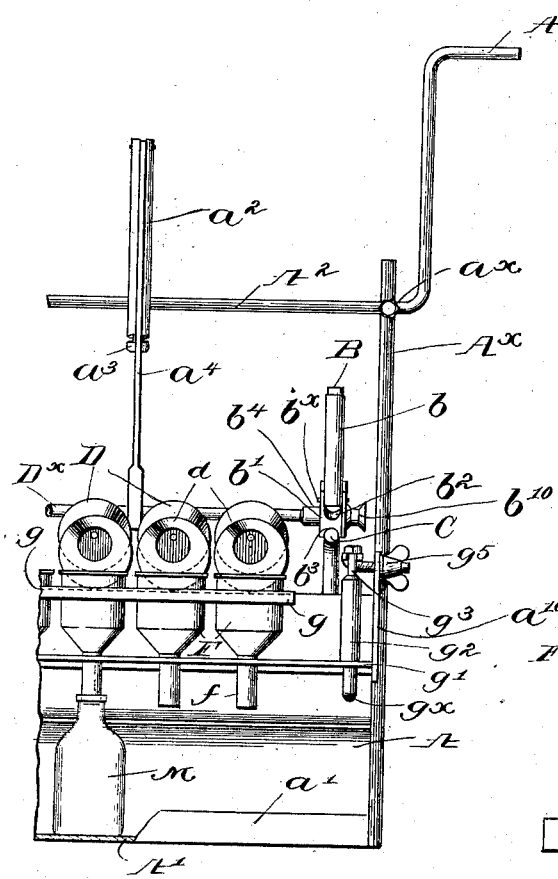
Figure 4:
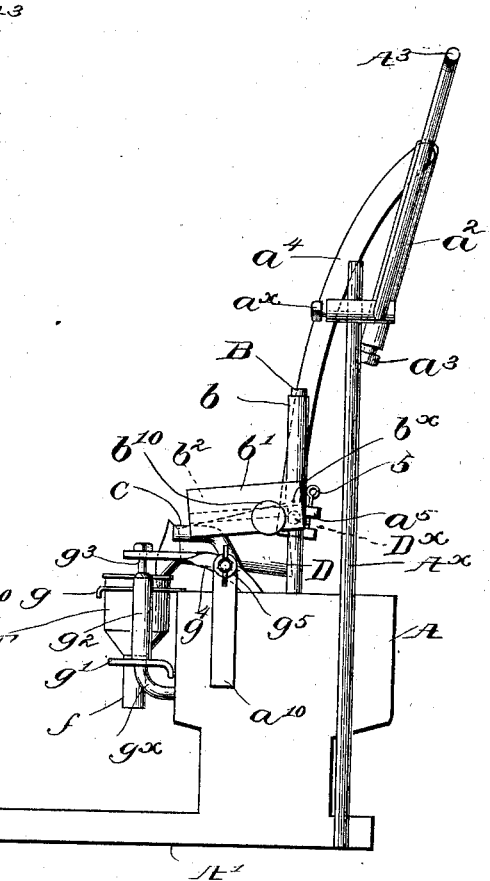
Figure 5:
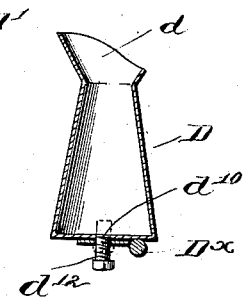

Figure 1 is a front elevation, centrally broken out, of an apparatus showing one embodiment of my invention, the supply tank or reservoir being broken out at the right to show the conveyers in position in the tank to be filled. Fig. 2 is a right-hand end elevation thereof, the end of the tank being broken out. Fig. 3 is a partial front elevation of the apparatus, showing the conveyers in discharging position. Fig. 4 is an end view thereof. Fig. 5 is a sectional view of one of the conveyers detached, showing one mode of slightly varying the capacity of the conveyer; and Fig. 6 is a perspective view, detached, of one of the travelers.

I have herein shown the apparatus as comprising a liquid-supply tank or reservoir A, extended from one to the other end of the apparatus and open at the top, into which the liquid to be measured out into separate vessels is poured, said tank having an extended base A' projecting in front and provided with an upturned lip or wall $a'$ for a purpose to be described. Strong upright posts $A^\times$, suitably secured to the tank, at the ends thereof, are provided at their upper ends with bearings $a^\times$ for an actuator, shown as a rock-shaft $A^2$, provided at one end with a crank or handle $A^3$, by which it may be turned or rocked. Inside the tank are secured two upright guide-rods B, extending upward from the bottom of the narrower part of the tank, which is shown in Figs. 2 and 4 as substantially hopper-shaped in cross-section, said guide-rods having sleeves $b$, Figs. 3 and 4, adapted to slide freely thereupon. The sleeves have pivotally connected therewith, at or near their lower ends, as at $b^\times$, Figs. 2 and 4, travelers, shown as blocks $b'$, longitudinally grooved at $b^2$ in their rear faces to receive the sleeves when the latter are lowered, as in Figs. 1 and 2, and also longitudinally grooved in their front faces at $b^3$ to engage and travel upon directing-cams C, which latter are shown upwardly extended, and forwardly-bent rods or bars secured in the tank in front of the guide-rods B.

Referring to Fig. 2, the cam C is shown as parallel to the guide-rod B up to the point 2, thence curving slightly upward and forward to 3, and then horizontal to its upper forwardly-extended extremity, so that as the travelers are raised, as will be described, they will ascend vertically to the points 2 of the cams. Between 2 and 3 the travelers will rock on their fulcra $b^\times$ on the sleeves $b$, tipping forward, and when the sleeves are at the upper end of their stroke, as in Figs. 3 and 4, the front ends of the travelers will rest on the horizontal portions of the cams below their fulcra $b^\times$. A series of conveyers D are rigidly secured at their bottoms, as herein shown, to a transverse supporting-bar $D^\times$, said conveyers being shaped substantially as quart or other liquid measures in common use, with a flaring top $d$ and a lip or spout $d'$. The ends of the supporting-bar are rigidly secured in sockets $b^4$, attached to or forming a part of the travelers $b'$, Figs. 1 and 3, so that when the latter are lowered in the deep and narrower portion of the tank, as in Fig. 2, the conveyers will be substantially upright and immersed in the contents of the tank to be filled. Arms $a^2$ are adjustably secured, as by set-screws $a^3$, to the rock-shaft $A^2$ and pivotally connected at their free ends to long links $a^4$, herein shown as forked or bifurcated at their lower ends at $a^5$ to embrace the supporting-bar, pins 5 holding the latter in the forks.

When the parts of the apparatus are in normal position, Figs. 1 and 2, the arms $a^2$ depend and the conveyers are in position to be filled from the contents of the tank; but by swinging the handle $A^3$ in the direction of arrow 6, Fig. 2, the arms will be swung up, acting through the links $a^4$ to elevate the sleeves $b$ on their guide-rods. The weight of the conveyers, which are secured to the travelers in front of their fulcra $b^\times$, keeps said travelers on the controlling-cams C, and as the travelers follow the cam portions 2 3 the conveyers are not only slightly tipped, but are moved bodily forward toward the front of the tank, so that when the travelers finally rock on the bends at 3 the lips or spouts $d'$ of the conveyers are depressed, and when the arms $a^2$ have swung past dead-center, Fig. 4, the bottoms of the conveyers will be elevated, so that the contents can be completely discharged. The vessels M to be filled are placed in the trough formed by the flanged base $A'$, one vessel for each conveyer, and in order to fill them expeditiously and without waste I have provided a set of cylindrical funnels F, having wide mouths and contracted elongated spouts $f$ to enter the tops of the vessels M. The bodies of the funnels pass through holes in a guide-shelf $g$, secured to the front of the tank, while the spouts pass through suitable apertures in a vertically-movable shelf-like support $g'$, having secured to it at its ends upright hollow sleeves $g^2$, provided at their upper ends with headed extensions $g^3$. Upturned guides $g^\times$, secured to the tank, are extended into said sleeves from their lower ends to guide the sleeves and attached funnel-support $g'$ vertically. Bent arms $g^4$ are fulcrumed on screw-studs $g^5$ in brackets $a^{10}$ on the tank ends, said arms at their upper outwardly-extended ends being slotted at $g^6$ to engage the headed extensions $g^3$, the lower ends of the the arms being extended down into the tanks and curved at $g^7$, as shown in Fig. 2. Each traveler $b'$ is shown as provided at its outer side with a suitable roll or stud $b^{10}$, which engages the adjacent arm $g^4$ at its lower end when the travelers are lowered, turning the arms on their fulcra $g^5$ to elevate the support $g'$ and the funnels. At such time the vessels M can readily be placed in position to be filled; but as the conveyers are raised, as has been described, the lower ends of the controlling-arms $g^4$ are swung to the rear as the rolls $b^{10}$ rise, due to the weight of the funnels, and the upper ends of the said arms descend, so that the spouts $f$ of the funnels are lowered into the mouths of the vessels M, Fig. 3, before the conveyers have reached their discharging position.

When the arms $a^2$ are swung up over dead-center, as in Fig. 4, the conveyers can be left in elevated and tipped position, if desired, to drain, as after washing out. When it is desired to clean the apparatus, the pins 5 are removed and the conveyers D on their support can be bodily removed, taking the travelers therewith. So, too, the fulcrum-studs $g^5$ can be taken out, releasing the controlling-arms $g^4$, and the funnels will not be vertically moved, as described, in the operation of the apparatus, and, if desired, the funnels themselves can be removed and the vessels to be filled can be supported directly on the support $g'$.

It is well known that many so-called "quart," "pint," or other bottles do not hold exactly such a quantity of liquid, but a less amount, and I have provided herein one simple form of device for regulating the capacity of the conveyers. Referring to Fig. 5, the bottom of the measure D is shown as provided with a stud $d^{10}$, threaded thereinto and provided with an external head $d^{12}$, by which the stud can be moved farther in or out of the conveyer. By moving the stud inward a certain quantity of liquid will be displaced, so that the amount received from the tank will be less than the maximum capacity of the conveyer, and by thus regulating the stud the quantity to be taken up by the conveyer is adjusted to the actual capacity of the vessel to be filled.

Various changes or modifications may be made in the construction and arrangement of the apparatus herein shown without departing from the spirit and scope of my invention.

Having fully described my invention, what I claim, and desire to secure by Letters Patent, is—

1. In an apparatus of the class described, a liquid-supply tank, a liquid-conveyer, a vertically-movable funnel under the lower end of which the vessel to be filled is placed, means to lower the conveyer into the tank, to be filled, and to thereafter lift the filled conveyer and tip it to discharge its contents into the funnel, and a controlling device governed by said means, to lower automatically the end of the funnel into the mouth of the vessel to be filled, and to thereafter lift the funnel into normal position.

2. In apparatus of the class described, a liquid-supply tank, a support for the vessels to be filled, a corresponding number of funnels, a series of open-mouthed, connected conveyers, means to carry the conveyers into the tank to be filled and thereafter to lift and tip them to discharge their contents into the funnels, and a controlling device for the funnels, governed by said means, to lower the ends of the funnels into the mouths of the vessels to be filled prior to the tipping of the conveyers.

3. In apparatus of the class described, a liquid-supply tank, a series of connected, open-mouthed conveyers, a support for the vessels to be filled, and means, including a rotatable actuator and connections including longitudinally-rigid links between it and the conveyers, to carry the latter into the tank to be filled, move them into position above the vessels to be filled, and to tip the conveyers to discharge their contents.

4. In apparatus of the class described, a liquid-supply tank, a support for the vessels to be filled, a series of vertically-movable funnels mounted above the support, a series of conveyers, means to lift them from the tank when filled into position higher than the mouths of the funnels, and thereafter to tip the conveyers to discharge their contents into the funnels, and a device to lower said funnels into the mouths of the vessels to be filled before the conveyers have discharged their contents.

5. In apparatus of the class described, a liquid-supply tank, upright guide-rods, sleeves longitudinally movable thereon, a transverse support pivotally mounted on said sleeves and having a series of rigidly-attached conveyers, a traveler rigidly secured to said support, a directing-cam for the traveler, to maintain the conveyers substantially upright when in the tank and to tip said support and conveyers when lifted, and actuating means connected with the support, to raise and lower the same, the sleeves and guide-rods directing such movement of the support.

6. In apparatus of the class described, a liquid-supply tank, a series of connected measuring-conveyers for the liquid, means to individually vary the capacity of the said conveyers, and means to place the conveyers in the tank to be filled, to lift them and tip them to discharge their contents, said means including an actuator rotatable in one direction to lift and tip the conveyers, opposite rotation of said actuators returning them to substantially-upright position and placing them in the tank.

7. In apparatus of the class described, a liquid-supply tank, a support for the vessels to be filled, a plurality of open-mouthed conveyers to convey liquid from the tank to such vessels, a common support to which said conveyers are rigidly attached, means to move said support into position to fill the conveyers and to thereafter lift the support and tip the same, to discharge the contents of the conveyers into the vessels to be filled, and detachable connections between said support and the actuating means therefor.

8. In apparatus of the class described, a liquid-supply tank, a plurality of rigidly-connected, open-mouthed conveyers, a corresponding number of funnels, to direct the liquid into the vessels to be filled, a normally-elevated funnel-support, means to lower the conveyers into the tank to be filled and thereafter to lift and tip them, to discharge their contents into the funnels, and a controlling device for the funnel-support, to lower the latter and place the spouts of the funnels into receiving vessels placed beneath them as the filled conveyers are lifted.

In testimony whereof I have signed my name to this specification in the presence of two subscribing witnesses.

. HERMAN STRATER.

Witnesses:
 JOHN C. EDWARDS,
 AUGUSTA E. DEAN.